US007699251B2

(12) United States Patent

Frick

(10) Patent No.: US 7,699,251 B2

(45) Date of Patent: Apr. 20, 2010

(54) DEVICE FOR DIVIDING MEDICATIONS AND METHOD OF USING THE SAME

(76) Inventor: Stacey Kevin Frick, 7516 Kousa Ct., Mason, OH (US) 45040-8424

( * ) Notice: Subject to any disclaimer, the term of this patent is extended or adjusted under 35 U.S.C. 154(b) by 727 days.

(21) Appl. No.: 11/537,828

(22) Filed: Oct. 2, 2006

(65) Prior Publication Data

US 2008/0078797 A1 Apr. 3, 2008

(51) Int. Cl.
*A47J 17/00* (2006.01)
*A47J 43/00* (2006.01)

(52) U.S. Cl. .................................... 241/168; 241/169.2

(58) Field of Classification Search ................. 241/168, 241/169.2, DIG. 27; 225/93, 103, 104; 30/124
See application file for complete search history.

(56) References Cited

U.S. PATENT DOCUMENTS 3,517,871 A * 6/1970 Gaffney et al. .............. 225/103
4,173,826 A 11/1979 Leopoldi et al.
5,038,475 A * 8/1991 Wolff .......................... 30/124
5,118,021 A 6/1992 Fiocchi
5,944,243 A 8/1999 Weinstein
D419,684 S 1/2000 Noble et al.
6,601,746 B2 * 8/2003 Buckley et al. ............. 225/103
6,637,683 B1 * 10/2003 (Lomax) Wilbur ....... 241/101.2
7,243,826 B2 * 7/2007 Darst ......................... 225/103
2003/0084574 A1 5/2003 Eric
2003/0155458 A1 8/2003 Shewchuk

* cited by examiner

*Primary Examiner*—Bena Miller
(74) *Attorney, Agent, or Firm*—Lafkas Patent LLC; David M. Lafkas; Matthew E. Vale

(57) ABSTRACT

The present invention is a device for cutting solid medications, whether in the form of capsules, tablets or pills. When cutting capsules, the capsules are retained to be divided by a first blade. Tablets and other forms of the medication are retained by pill stabilizers and cut by a second blade. The device also may have a pill crusher and a section to hold whole or divided medications.

10 Claims, 6 Drawing Sheets

DEVICE FOR DIVIDING MEDICATIONS AND METHOD OF USING THE SAME

BACKGROUND

The present invention relates generally to medical care devices, and more particularly to devices for accurately and precisely dividing predetermined dosages of substantially solid medicines, whether in a tablet or capsule form.

Modern oral medicines come in a variety of forms depending on the desired effect, manufacturing abilities, shelf life, personal preference, and the like. Examples include tablets, capsules, liquids, gels, gums, and dissolving strips. Of these, tablets and capsules are the most widely accepted forms. Tablets may be defined as generally small, usually soluble masses of medicine, often held together with a binder. Capsules are similar, except capsule are usually substantially cylindrical shaped and comprise an outer coating or layer to hold the medication together.

Medications typically are produced in a limited number of concentrations or dosages. For example, a tablet may be produced in dosages of 150 and 250 mg active ingredient. Dosage variations for a particular medication may be driven by financial, manufacturing, and/or effectiveness considerations.

As medications are produced and delivered in predetermined dosages, patients may sometimes need to divide a medication into smaller portions in order to achieve a proper dosage as prescribed by a medical professional.

Further, some patients have difficulty swallowing larger tablets and capsules. Thus, some patients find it easier to divide a tablet or capsule medication into smaller, more easily swallowed portions, even where the full-sized tablet or capsule is the proper dosage for the patient.

The prior art is ripe with examples of various tablet dividers. However, a greater number of medications are being produced in capsule form. The tablet dividers of the prior art generally cannot consistently, properly, and accurately divide a medication in capsule form into smaller dosages.

Further, many more tablets are being produced with an outer shell which makes prior art medication dividers more difficult to use properly, as the outer shell may be difficult to pierce in order to divide the tablet as desired.

Thus, what is desired is a device for properly and accurately dividing tablet and capsule medications into small dosages.

SUMMARY

The various exemplary embodiments of the present invention include a device for dividing medications into smaller dosages. The device is comprised of a housing having a top section and a bottom section. A backend of the top section is connected to a backend of the bottom section via one or more hinges such that an underside portion of the top section is substantially adjacent to an upper-side portion of the bottom section when the one or more hinges are closed, and the upper-side portion of the bottom section is a substantially negative profile of the underside portion of the top section. The top section has one or more capsule loading ports, a first cutting blade, and a second cutting blade. Each capsule loading port has a substantially circular cross-section and is located on sides of the top section between the backside and a front end of the top section. The first cutting blade is substantially parallel and equidistant to the sides of the top section and connected to the top section via two or more flexible retaining means, such that the first cutting blade is in a start position as capsules are loaded into the one or more capsule loading ports, and the first cutting blade is in a second position when the first cutting blade is moved towards the underside portion of the top section and divides the capsules in the one or more capsule loading ports. The second cutting blade fixedly connected to the underside of the top section. The bottom section has two or more pill stabilizers and a medication storage area. The two or more pill stabilizer being for retention of medications to be divided by the second cutting blade when the one or more hinges are closed.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Various exemplary embodiments of the present invention are described herein and in the associated figures.

Figure 1:
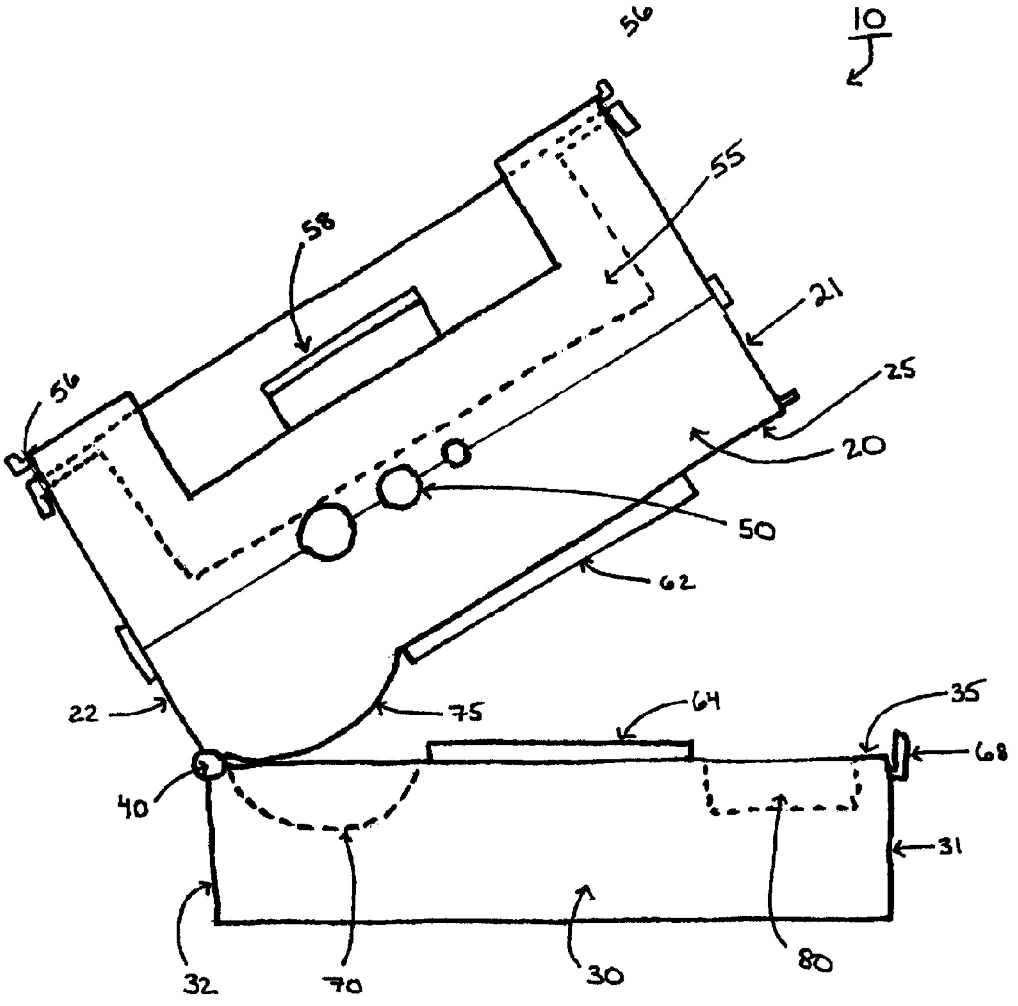
FIG. 1 is an illustration of side-perspective of an exemplary embodiment of the present invention.
Figure 2:
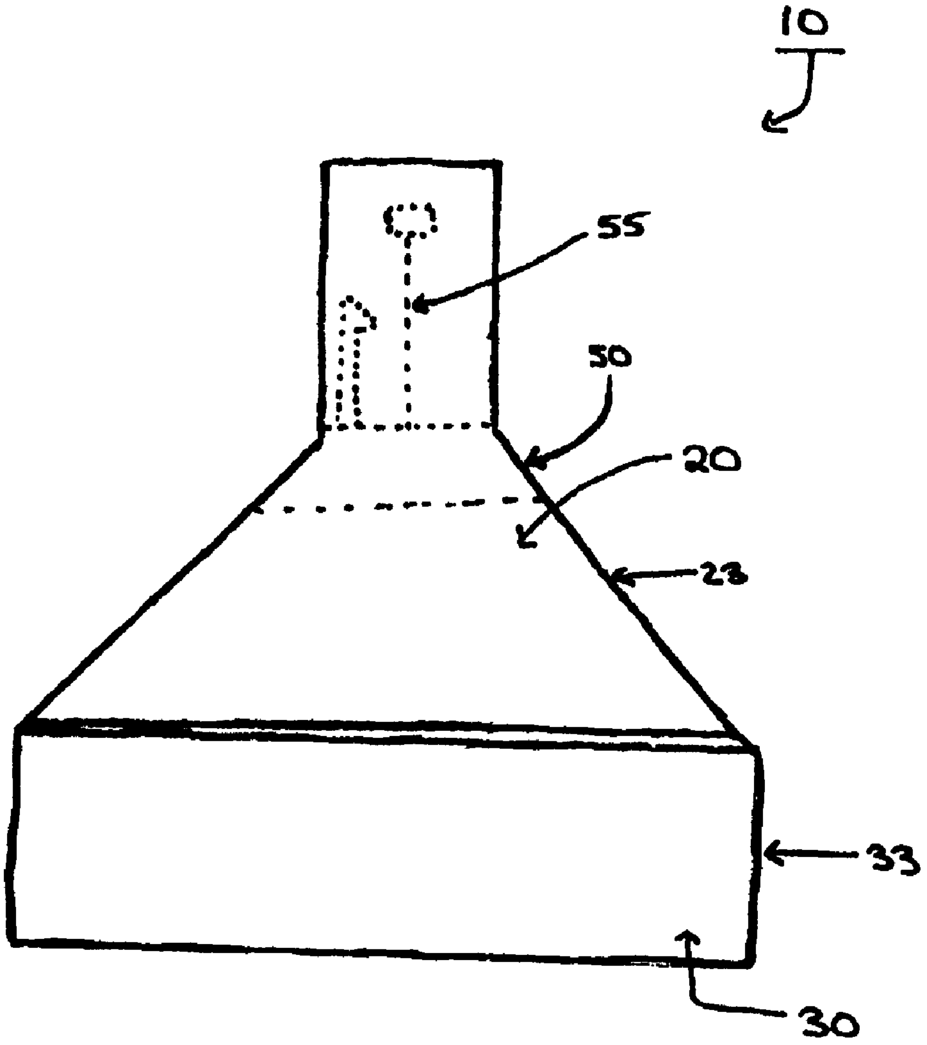
FIG. 2 is an illustration of front view of an exemplary embodiment of the present invention.
Figure 3:
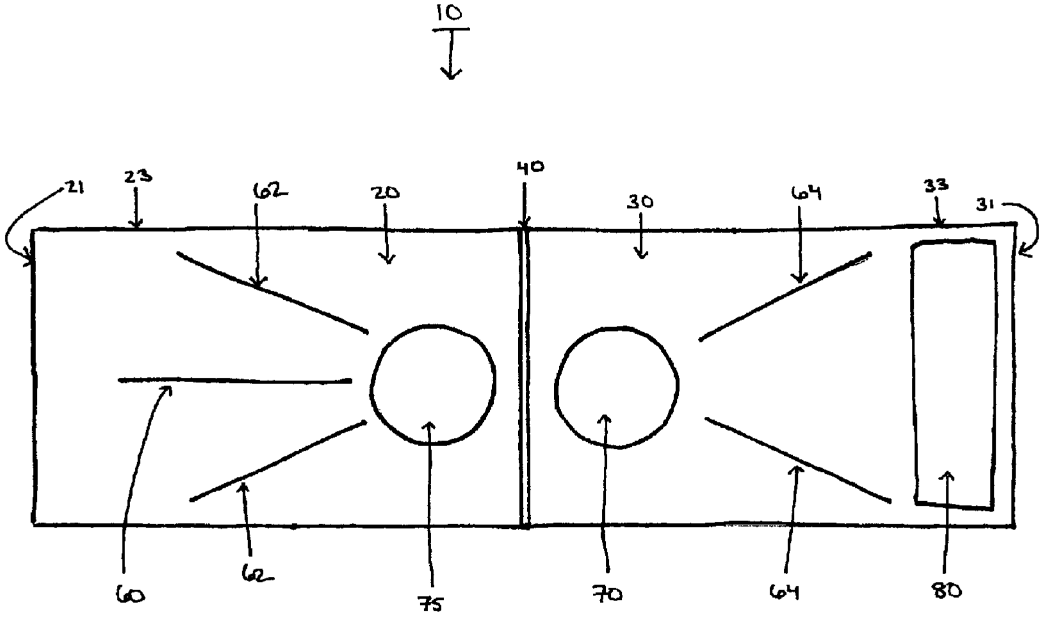
FIG. 3 is an illustration of a top view of an exemplary embodiment of the present invention wherein the one or more hinges are open.

As shown in FIG. 1, the various exemplary embodiments of the present invention include a device 10 for dividing preformed solid medications into smaller dosages.

The device is comprised of a top section 20 and a bottom section 30. A backend 22 of the top section is connected to the backend 32 of the bottom section via one or more hinges 40. It is preferred that when the one or more hinges are closed, an underside portion 25 of the top section is substantially adjacent to an upper-side 35 portion of the bottom section. Preferably, the upper-side portion of the bottom section is a substantially negative profile of the underside portion of the top section.

In addition to having a backend, the top section also comprises a front end 21 and sides 23 connecting the front end to the backend. The top section may be of any geometric shape, but preferably is rectangular in shape.

Likewise, the bottom section is comprised of a backend, a front end 31 and sides 33 connecting the front end to the backend. The bottom section may be of any geometric shape, but preferably is rectangular in shape. It is also preferred that the shape and size of the bottom section be substantially similar to that of the top section.

The top section is comprised of one or more capsule loading ports 50, a first cutting blade 55, and a second cutting blade 60.

The one or more capsule loading ports of the various exemplary embodiments have a substantially circular cross-sectional shape. That is when viewing the one or more capsule loading ports from the sides of the top section, the one or more capsule loading ports appear as circular-shaped holes in the side of the top section. As such, capsules may be loaded directly into these circular shaped holes.

It is preferred that the one or more capsule loading ports extend substantially through the top section such that each of the one or more capsule loading ports are visible on each side of the top section. Thus, the top section, at least in a region comprising the one or more capsule loading ports, should be no more than slightly greater than the length of a medicine capsule. Further, where the one or more capsule loading ports extend substantially through the top section, circular-shaped holes appear on each side of the top section. Thus, in a preferred embodiment, capsules may be loaded from either side of the top section.

In the various exemplary embodiments, each of the one more capsule loading ports may retain a single medicine capsule. In a preferred embodiment, the one or more capsule loading ports are all of the substantially identical predetermined size, that is, for example, the cross-sectional of each capsule loading port is of the same diameter.

In a more preferred embodiment, where there are multiple capsule loading ports, each capsule loading ports is of a different size than each of the other capsule loading ports of the device. For example, the device may include three capsule loading ports, each of a cross-sectional diameter of about 9 mm, about 7 mm, and about 6 mm.

The first cutting blade of the various exemplary embodiments of the present invention is connected to the top section. It is preferred that the first cutting blade of the exemplary embodiments is connected to the top section via two or more flexible retaining means 56. The flexible retaining means are preferably attached to at least each of the ends of the first cutting blade. The flexible retaining means may be rubber bands.

Figure 5:
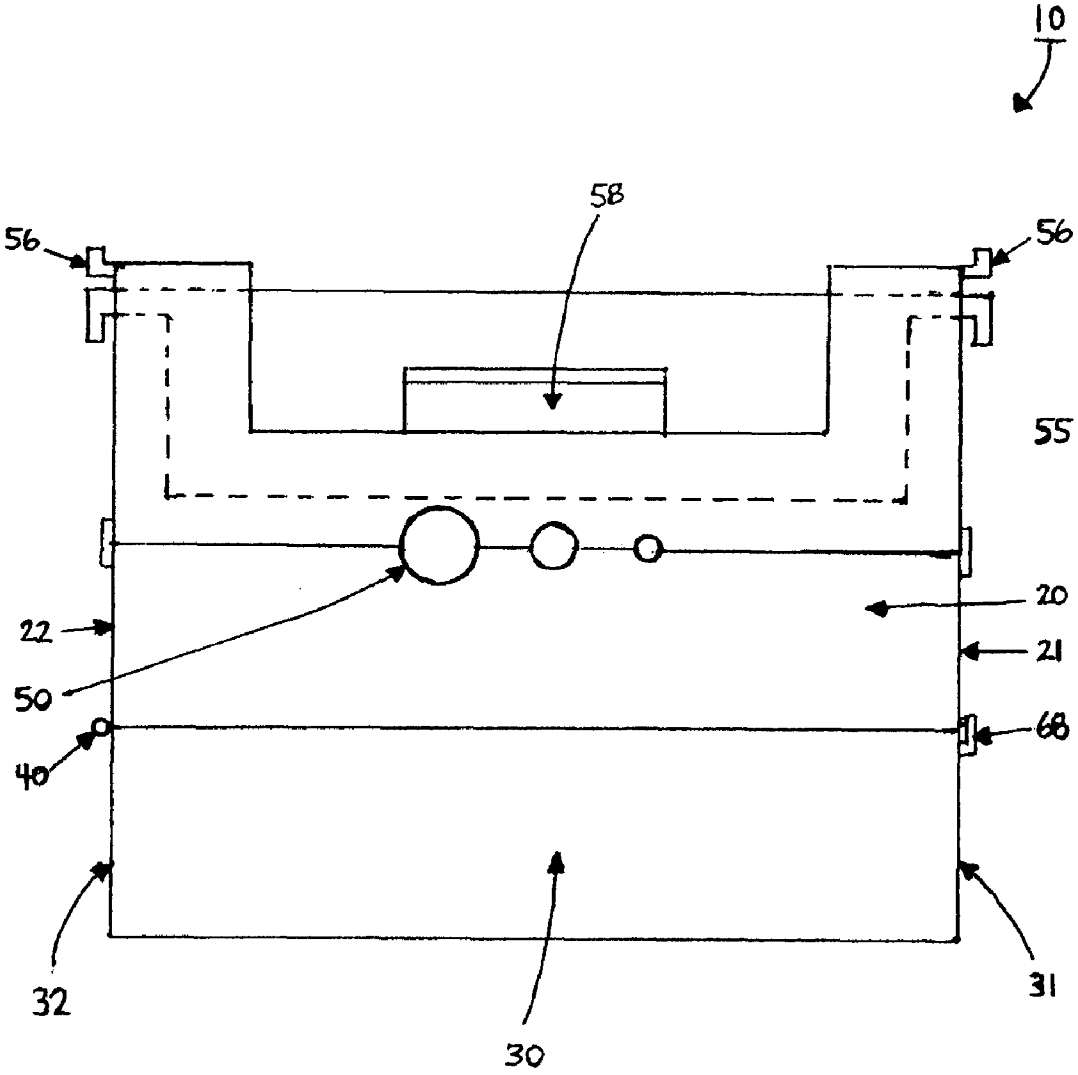
FIG. 5 is an illustration of a side perspective of an exemplary embodiment of the present invention.
Figure 6:
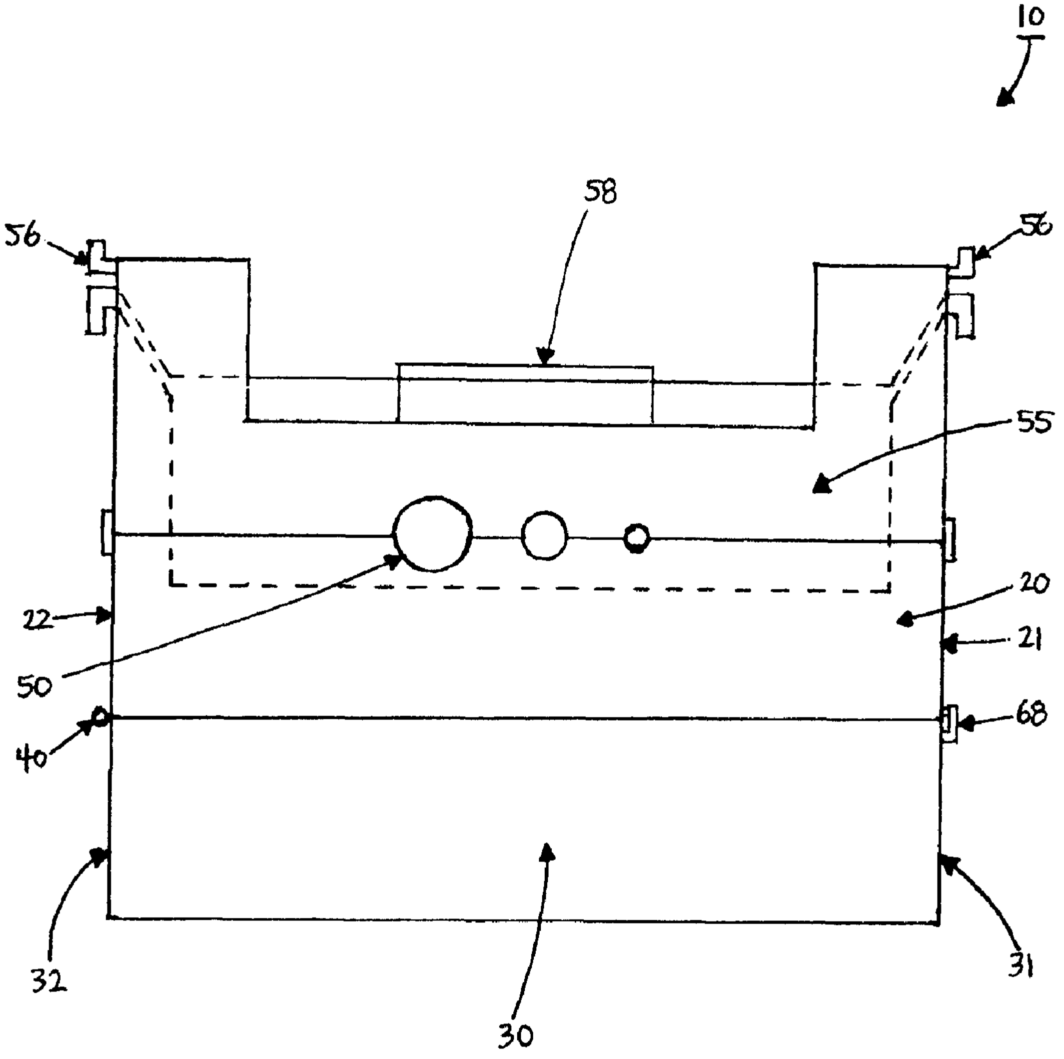
FIG. 6 is an illustration of a side perspective of an exemplary embodiment of the present invention.

In the various exemplary embodiments, the first cutting blade is substantially parallel to the one or more capsule loading ports, and preferably the first cutting blade is substantially equidistant from each of the sides of the top section. The first cutting blade is in a start position as medicine capsules are loaded into the one or more capsule loading ports. The first cutting blade is in a second position when the first cutting blade is moved towards the underside portion of the top section and thereby divides each of the capsules loaded into the one or more capsule loading ports. It is preferred that the first cutting blade not extend below the underside portion of the top section. See, for example, FIG. 5, which shows the first cutting blade in the start position and FIG. 6, which shows the first cutting blade in the second position.

As the first cutting blade divides each of the capsules loaded into the one or more capsule loading ports, it is preferred that the capsules be divided into two substantially equal pieces. Once, divided, the capsules may be removed through the one or more capsule loading ports by tilting.

It is also preferred that when the first cutting blade is in the second position, it is held in the second position via a fastening means 58. The fastening means may be comprised of, for example, a latch, a hook, and the like.

In an exemplary embodiment, a retaining means may extend around the top section to retain the capsules loaded into the one or more capsule loading ports in the one or more capsule loading ports when the first cutting blade divides the capsules. Examples of such retaining means may be a rubber band, fabric, and the like.

The first cutting blade may be of any size, so long as it fits in the device. In a preferred embodiment, a blade depth of the first cutting blade is about 2 cm to about 10 cm.

In the various exemplary embodiments, the second cutting blade is fixedly connected to the underside portion of the top section of the device. The second cutting blade has a blade depth of about 1 cm to about 10 cm.

The second cutting blade is substantially parallel to the one or more capsule loading ports, and preferably the second is substantially equidistant from each of the sides of the top section.

In an exemplary embodiment, one or more blade guards 62 are located on the underside of the top section to surround the second cutting blade. The one or more blade guards may extend outward and away from the second cutting blade starting from an end of the second cutting blade nearest to the backend of the top section, may extend inward and towards the second cutting blade starting from an end of the second cutting blade nearest to the backend of the top section, or a combination thereof.

In the various exemplary embodiments, the bottom section includes two or more pill stabilizers 64. The pill stabilizers are located on the upper side of the bottom section of the device. The pill stabilizers may extend outward and away from the second cutting blade on the top section starting from an end of the second cutting blade nearest to the backend of the top section, may extend inward and towards the second cutting blade on the top section starting from an end of the second cutting blade nearest to the backend of the top section, or a combination thereof.

Figure 4:
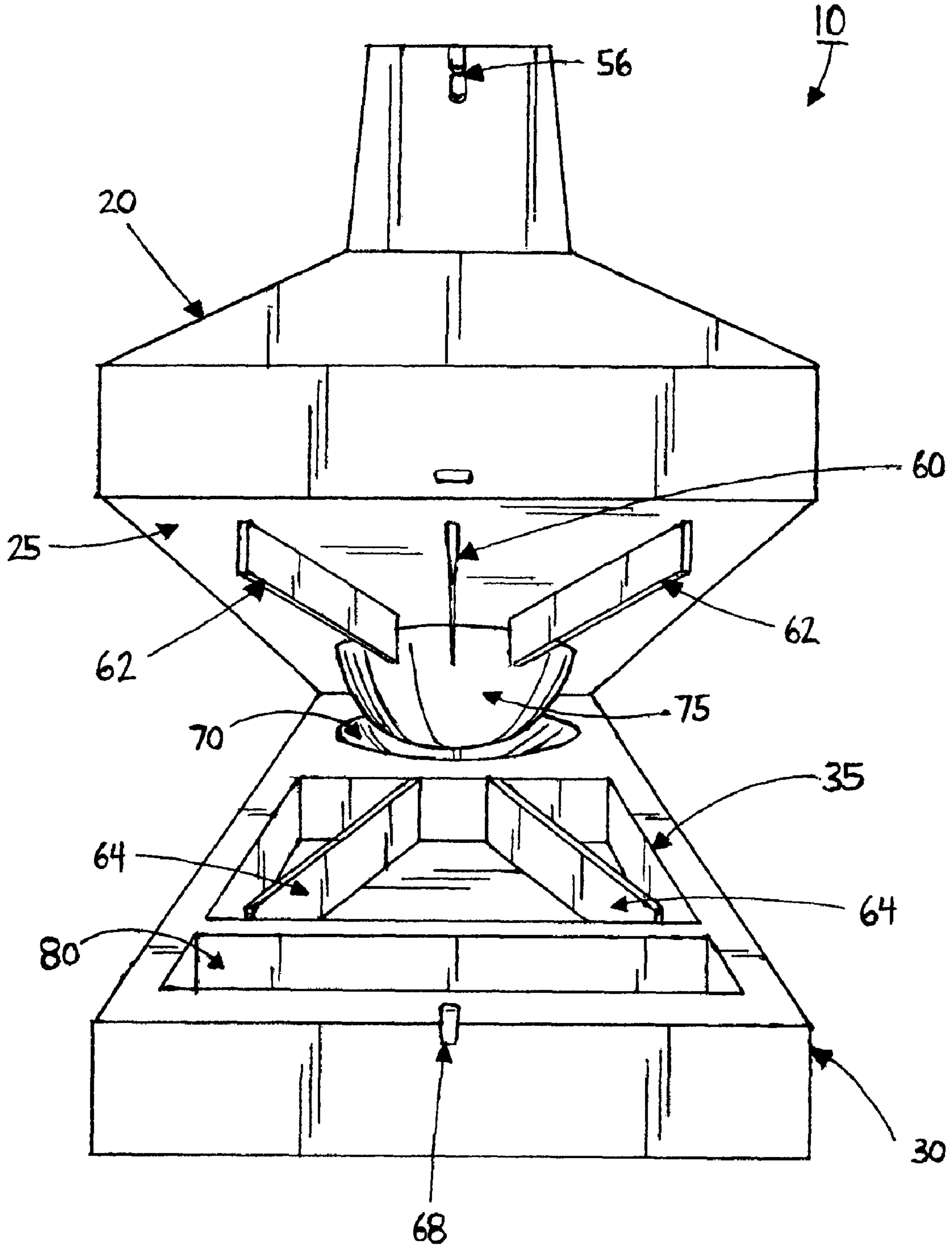
FIG. 4 is an illustration of a front view of an exemplary embodiment of the present invention.

In a preferred embodiment, the one or more blade guards and the pill stabilizers are substantially the same shape such that when the one or more hinges are closed, the one or more blade guards rest substantially outside of or inside of the two or more pill stabilizers. See for example, FIG. 4.

Medicines, in the form of tablets and pills may be placed in the upper side of the bottom section of the device and positioned between the one or more pill stabilizers. As the one or more hinges are closed, the second cutting blade is moved closer to the upper side of the bottom section and substantially divides the medicines positioned between the one or more pill stabilizers. It is preferred that the capsules be divided into two substantially equal pieces.

Upon closing of the one or more hinges, the underside portion top section may be maintained substantially against the upper-side portion of the bottom section via a locking means 68. The locking means may be a latch, hook, or the like.

In various exemplary embodiments, the uppers-side of the bottom section may further comprise a concave pill crushing section 70. The concave pill crushing section is preferably located substantially towards the backend of the bottom section.

In the various exemplary embodiments in which the bottom section comprises a concave pill crushing section, the underside of the top section further comprises a convex pill crushing section 75 that corresponds to and is substantially adjacent to the concave pill crushing section when the one or more hinges are closed.

In various exemplary embodiments, the upper-side of the bottom section may further comprise a storage area 80.

While the invention has been described in conjunction with specific embodiments, it is evident that many alternatives, modifications and variations will be apparent to those skilled in the art in light of the foregoing description and examples, and without deviating from the contemplated scope of the present invention. Accordingly, it is intended to embrace all such alternatives, modifications and variations which fall within the spirit and scope of the appended claims.

What is claimed is:

1. A device for dividing medications into smaller dosages, the device being comprised of:

a housing having a top section and a bottom section, a backend of the top section connected to a backend of the bottom section via one or more hinges such that an underside portion of the top section is substantially adjacent to an upper-side portion of the bottom section when the one or more hinges are closed, and the upper-side portion of the bottom section is a substantially negative profile of the underside portion of the top section;

the top section having one or more capsule loading ports, a first cutting blade, and a second cutting blade;

each capsule loading port having a substantially circular cross-section and located on sides of the top section between the backside and a front end of the top section;

the first cutting blade substantially parallel and equidistant to the sides of the top section and connected to the top section via two or more flexible retaining means, wherein the first cutting blade is in a start position as capsules are loaded into the one or more capsule loading ports, and the first cutting blade is in a second position when the first cutting blade is moved towards the underside portion of the top section and divides the capsules in the one or more capsule loading ports;

the second cutting blade fixedly connected to the underside of the top section;

the bottom section having two or more pill stabilizers and a medication storage area, the two or more pill stabilizer being for retention of medications to be divided by the second cutting blade when the one or more hinges are closed.

2. The device according to claim 1, further comprising a concave pill crushing section in the bottom section corresponding to a convex pill crushing section in the top section.

3. The device according to claim 1, wherein the two or more flexible retaining means comprise rubber bands.

4. The device according to claim 1, wherein the depth of the first cutting blade is about 2 cm to about 10 cm.

5. The device according to claim 1, wherein the depth of the second cutting blade is about 1 cm to about 10 cm.

6. The device according to claim 1, further comprising a fastening means for holding the first cutting blade in a second position upon dividing the one or more capsules.

7. The device according to claim 1, further comprising a locking means maintain the front end of the top section to a front end of the bottom section when the one or more hinges are closed.

8. The device according to claim 1, wherein each of the two or more pill stabilizers have a start end and a second end, the start end being centrally located between sides between the back end and a front end of the upper-side portion of the bottom section, and the second end being connected to the start end and closer to the sides and the front end of the bottom section.

9. The device according to claim 1, wherein one or more blade guards are located on the underside of the top section to surround the second cutting blade.

10. The device according to claim 9, wherein the one or more blade guards rest outside or inside the two or more pill stabilizers.

* * * * *